United States Patent
Fujii et al.

(10) Patent No.: US 11,518,385 B2
(45) Date of Patent: *Dec. 6, 2022

(54) STEERING ASSIST APPARATUS

(71) Applicant: TOYOTA JIDOSHA KABUSHIKI KAISHA, Toyota (JP)

(72) Inventors: Shota Fujii, Susono (JP); Kentaro Matsumoto, Yokohama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 321 days.

This patent is subject to a terminal disclaimer.

(21) Appl. No.: 16/864,853

(22) Filed: May 1, 2020

(65) Prior Publication Data

US 2020/0255010 A1  Aug. 13, 2020

Related U.S. Application Data

(63) Continuation of application No. 15/996,779, filed on Jun. 4, 2018, now Pat. No. 10,676,086.

(30) Foreign Application Priority Data

Jun. 6, 2017 (JP) .................. 2017-111923

(51) Int. Cl.
*B60W 30/12* (2020.01)
*B60Q 9/00* (2006.01)
(Continued)

(52) U.S. Cl.
CPC ............. *B60W 30/12* (2013.01); *B60Q 9/00* (2013.01); *B62D 15/025* (2013.01);
(Continued)

(58) Field of Classification Search
CPC .......... B60W 30/18163; B60W 30/12; B60W 50/16; B60W 2050/143; B60W 2710/20; B60W 60/005
See application file for complete search history.

(56) References Cited

U.S. PATENT DOCUMENTS 6,134,491 A  10/2000 Kawagoe et al.
6,178,365 B1  1/2001 Kawagoe et al.
(Continued)

FOREIGN PATENT DOCUMENTS

JP  2002-264826 A  9/2002
JP  2009-274594 A  11/2009
(Continued)

OTHER PUBLICATIONS

Nakamura, WO2017047261, Mar. 23, 2017 (machine translation).
(Continued)

*Primary Examiner* — Jeff A Burke
*Assistant Examiner* — Jerrod Irvin Davis
(74) *Attorney, Agent, or Firm* — Sughrue Mion, PLLC

(57) ABSTRACT

A steering assist apparatus comprises a steering assist control means for performing a lane tracing assist control (LTA) and a lane changing assist control (LCA) and a non-holding determination means for determining whether or not a first non-holding condition that a non-holding duration time is more than or equal to a first time is satisfied and whether or not a second non-holding condition that the non-holding duration time is more than or equal to a second time shorter than the first time is satisfied. The steering assist control means raises a warning when the second non-holding condition becomes satisfied and stops the LTA when the first non-holding condition becomes satisfied while performing the LTA, and raises a waring when the second non-holding condition becomes satisfied whereas continues the LCA until a completion condition of the LCA becomes satisfied regardless of the non-holding while performing the LCA.

3 Claims, 7 Drawing Sheets

(51) Int. Cl.
  *B62D 15/02* (2006.01)
  *B60W 50/16* (2020.01)
  *B60W 50/14* (2020.01)

(52) U.S. Cl.
  CPC ......... *B62D 15/0255* (2013.01); *B60W 50/16* (2013.01); *B60W 2050/143* (2013.01); *B60W 2540/00* (2013.01); *B60W 2710/20* (2013.01)

(56) References Cited

U.S. PATENT DOCUMENTS

| | | | |
|---|---|---|---|
| 2008/0183342 A1* | 7/2008 | Kaufmann | B62D 1/286 |
| | | | 701/1 |
| 2012/0265431 A1 | 10/2012 | Hayakawa et al. | |
| 2013/0231830 A1 | 9/2013 | Van Dan Elzen et al. | |
| 2016/0107687 A1 | 4/2016 | Yamaoka | |
| 2016/0121886 A1* | 5/2016 | Eigel | B60W 30/09 |
| | | | 701/23 |
| 2016/0288707 A1 | 10/2016 | Matsumura | |
| 2017/0088175 A1 | 3/2017 | Okuda et al. | |
| 2017/0113686 A1 | 4/2017 | Horita et al. | |
| 2018/0037224 A1* | 2/2018 | Bogner | B60W 50/082 |
| 2018/0178713 A1 | 6/2018 | Fujii | |
| 2018/0297611 A1 | 10/2018 | Fujisawa et al. | |

FOREIGN PATENT DOCUMENTS

| | | |
|---|---|---|
| JP | 2015-131544 A | 7/2015 |
| JP | 2017-65273 A | 4/2017 |
| WO | 2011/077915 A1 | 6/2011 |
| WO | 2015/156146 A1 | 10/2015 |
| WO | 2017/038351 A1 | 3/2017 |
| WO | 2017/047261 A1 | 3/2017 |

OTHER PUBLICATIONS

Yoshiji, JP2002264836, Sep. 18, 2002 (machine translation).
Communication dated Aug. 27, 2019, from the Japanese Patent Office in counterpart application No. 2017-111923.

* cited by examiner

STEERING ASSIST APPARATUS

CROSS-REFERENCE TO RELATED APPLICATIONS

The present application is a continuation of U.S. application Ser. No. 15/996,779 filed on Jun. 4, 2018, in the U.S. Patent & Trademark Office, which is based on and claims priority under 35 U.S.C. § 119 to Japanese Patent Application No. 2017-111923 filed on Jun. 6, 2017, in the Japan Patent Office, the disclosures of which are incorporated by reference herein in their entireties.

TECHNICAL FIELD

The present invention relates to a steering assist apparatus to assist a driver with a steering operation.

BACKGROUND ART

A steering assist apparatus applied to a vehicle and performing a control to assist a driver with a steering operation has been conventionally known (refer to Japanese Patent Application Laid-Open (kokai) No. 2009-274594). This control to assist the driver with the steering operation (hereinafter, this control is also referred to as a "steering assist control") includes, for example, a lane tracing assist control (hereinafter, also referred to as "LTA"), a lane changing assist control (hereinafter, also referred to as "LCA"), and the like.

The LTA is a control to assist (support) the driver with the steering operation such that a traveling position of the vehicle is kept at a predetermined position in a lane in a lane width direction based on lane information including a relative positional relationship of the vehicle with respect to the lane. The LCA is a control to assist the driver with the steering operation such that the vehicle changes a lane from an original lane on which the vehicle is currently traveling to a target lane adjacent to the original lane based on the above lane information. Hereinafter, a vehicle in which the steering assist apparatus is mounted is also referred to as an "own vehicle".

More specifically, in the steering assist control such as the LTA and the LCA, a steered angle of each of steered wheels is controlled in such a manner that a yaw angle (an angle formed by a direction along which a lane is formed and a direction toward which the own vehicle is oriented) coincides with a target yaw angle. It should be noted that the target yaw angle for the LTA is zero degree.

SUMMARY OF THE INVENTION

The steering assist control such as the LTA and the LCA is a control merely to assist (support) the driver of the own vehicle with the steering operation, and therefore differs from an automatic drive control. Hence, it is basically required for the driver to hold the steering wheel during a performance of the steering assist control. However, there may be a case where the driver overestimates the steering assist control and therefore does not hold the steering wheel in spite of the steering assist control being performed.

Therefore, a following configuration is adopted, the configuration being a configuration where the LTA is stopped when a time for which a state where the driver is not holding the steering wheel during a performance of the LTA (hereinafter, this state is referred to as a "non-holding state") is continuing (hereinafter, this time is referred to as a "non-holding duration time") becomes more than or equal to a predetermined time. According to this configuration, the driver comes to hold the steering wheel when the driver has noticed that the LTA is not being properly performed (for example, a case where a state in which the yaw angle is not apparently zero degree is continuing) as a result of the non-holding duration time becoming more than or equal to the predetermined time and the LTA being stopped. That is, by adopting this configuration, it becomes possible to urge the driver to hold the steering wheel during a performance of the LTA. Therefore, a situation where "the driver overestimates the steering assist control and therefore does not hold the steering wheel in spite of the LTA being performed" can be suppressed from occurring.

However, a following problem occurs if the above configuration is applied to the LCA. That is, for example, in a case where the non-holding duration time has become more than or equal to the predetermined time and the LCA is stopped when the own vehicle is striding over "a white line positioned between the original lane and the target lane" (that is, when the yaw angle has a value of not being zero (a nonzero value)), the own vehicle continues to travel, maintaining the yaw angle with the nonzero value of a point in time when the LCA has been stopped. However, to begin with, the LCA is a control to assist a vehicle in changing a lane, and thus during a performance of this control, it is not particularly unnatural that the own vehicle travels with a yaw angle of a nonzero value. Therefore, it becomes impossible for the driver to distinguish whether the LCA is being performed or stopped (that is, the driver misrecognizes that the LCA is being performed in spite of the LCA being stopped), and as a result, it becomes highly likely that the own vehicle deviates from the target lane without the driver noticing and cannot change a lane properly.

The present invention is made to resolve the problem above. That is, one of objects of the present invention is to provide a steering assist apparatus enabling a vehicle to properly change a lane by the LCA while suppressing a driver of the vehicle from overestimating a steering assist control by urging the driver to hold a steering wheel during a performance of the steering assist control.

A first steering assist apparatus of the present invention (hereinafter, may be referred to as a "first invention apparatus") is applied to a vehicle.

This first invention apparatus comprises;

lane recognition means (12) for recognizing a lane to acquire lane information including a relative positional relationship of the vehicle with respect to the lane;

steering assist control means (10, 20) for performing a lane tracing assist control to assist a driver with a steering operation by changing a steered angle of a steered wheel of the vehicle such that a traveling position of the vehicle is kept at a predetermined position in a lane in a lane width direction based on the lane information and a lane changing assist control to assist the driver with the steering operation by changing the steered angle such that the vehicle changes a lane from an original lane on which the vehicle is currently traveling to a target lane adjacent to the original lane based on the lane information;

non-holding detection means (42) for detecting a non-holding state which is a state where the driver of the vehicle is not holding a steering wheel; and non-holding determination means (S626, S610, S618) for measuring a non-holding duration time which is a time for which the non-holding state is continuing during a performance of either the lane tracing assist control or the lane changing assist control to determine whether or not a first non-holding condition that the non-holding duration time is more than or equal to a predetermined first time (tu) is satisfied and whether or not a second non-holding condition that the non-holding duration time is more than or equal to a predetermined second time (tw) shorter than the first time (tu) is satisfied, wherein, the steering assist control means (10, 20) is configured to;

during a performance of the lane tracing assist control, warn the driver (S624) by means of at least one of sound, an indication, and vibration when the second non-holding condition is determined to be satisfied (S610: Yes); and stop the lane tracing assist control (S628) when the first non-holding condition is determined to be satisfied (S626: Yes), and during a performance of the lane changing assist control, warn the driver (S622) by means of at least one of sound, an indication, and vibration when the second non-holding condition is determined to be satisfied (S618: Yes), whereas continue the lane changing assist control until a completion condition of the lane changing assist control becomes satisfied (S620: Yes) regardless of the non-holding duration time.

The first invention apparatus comprises the lane recognition means, the steering assist control means, the non-holding detection means, and the non-holding determination means.

The lane recognition means recognizes the lane and acquires the lane information including the relative positional relationship of the vehicle with respect to the lane. The lane is a region defined by white lines, for example. Therefore, the relative positional relationship of the vehicle with respect to the lane can be acquired by recognizing the lane.

The steering assist control means performs the lane tracing assist control (LTA) and the lane changing assist control (LCA).

The LTA is a control to assist (support) the driver with the steering operation by changing the steered angle of the steered wheel of the vehicle such that the traveling position of the vehicle is kept at the predetermined position in the lane in the lane width direction based on the lane information. It should be noted that "the predetermined position in the lane width direction" is a position offset from a center position in the lane in the lane width direction toward the lane width direction by a predetermined distance with a value of more than or equal to zero and that is a position enabling the vehicle not to deviate from the lane, provided that the traveling position of the vehicle is positioned at this position.

The LCA is a control to assist the driver with the steering operation by changing the steered angle of the steered wheel of the vehicle such that the vehicle changes the lane from the original lane on which the vehicle is currently traveling to the target lane adjacent to the original lane based on the lane information.

The non-holding detection means detects the non-holding state which is a state where the driver of the vehicle is not holding a steering wheel.

The non-holding determination means determines whether or not the first non-holding condition that the non-holding duration time which is "a time for which the non-holding state is continuing during a performance of the LTA or the LCA" is more than or equal to the predetermined first time is satisfied and whether or not the second non-holding condition that the non-holding duration time is more than or equal to the predetermined second time shorter than the first time is satisfied. It should be noted that each of the first time and the second time may be a variable relating to a vehicle speed.

In the first invention apparatus, the non-holding duration time is measured not only during a performance of the LTA, but also during a performance of the LCA. Besides, when it is determined that the second non-holding condition is satisfied during a performance of the LCA, the steering assist control means warns the driver by means of at least one of sound, an indication, and vibration, whereas continues the LCA until the completion condition of the LCA becomes satisfied (that is, to the end) regardless of the non-holding duration time even though the non-holding state continues after the warning. By measuring the non-holding duration time also during a performance of the LCA and raising the warning when the second non-holding condition becomes satisfied as stated above, it becomes possible to urge the driver to hold the steering wheel also during a performance of the LCA. On the other hand, by not stopping but continuing the LCA to the end regardless of the non-holding duration time (that is, for example, even though the non-holding duration time increases as a result of the driver not holding the steering wheel in spite of the warning being raised during a performance of the LCA), the LCA is prevented from being stopped in the midst of a performance thereof. Therefore, the vehicle can be prevented from deviating from the target lane due to the LCA being stopped. Hence, according to a configuration of the first invention apparatus, the vehicle can properly change the lane by the LCA while suppressing the driver from overestimating the steering assist control by urging the driver to hold the steering wheel during a performance of the steering assist control.

In addition, in the first invention apparatus, when it is determined that the second non-holding condition becomes satisfied during a performance of the LTA, the steering assist control means raises the warning to the driver. The non-holding state is dissolved when the driver holds the steering wheel upon this warning. Therefore, during a performance of the LTA, a possibility that the non-holding state continues for more than or equal to the first time (a time longer than the second time) can be reduced. That is, a situation where "the first non-holding condition becomes satisfied and the LTA is stopped" can be suppressed from occurring. As a result, the LTA can be stably performed.

In another aspect of the steering assist apparatus of the present invention, the steering assist control means (10, 20) is configured to start the lane changing assist control when a predetermined first starting condition becomes satisfied (S612: Yes), the first starting condition includes that the lane tracing assist control is being performed, and when the first starting condition becomes satisfied, the lane changing assist control is started in place of the lane tracing assist control.

According to this configuration, the first starting condition of the LCA does not become satisfied when the LTA is not being performed, and therefore the LCA cannot be started. That is, when the LTA is stopped by being determined that the first non-holding condition becomes satisfied during a performance of the LTA, the LCA cannot be started. Therefore, when the driver demands a performance of the LCA, the driver comes to hold the steering wheel (strictly, comes to hold the steering wheel so that the non-holding duration time does not become more than or equal to the first time) in order for the LTA not to be stopped (that is, in order for the first non-holding condition not to be satisfied). Hence, it becomes possible to urge the driver to hold the steering wheel during a performance of the LTA.

In another aspect of the steering assist apparatus of the present invention, the first starting condition further includes that the warning is not being raised.

According to this configuration, when the warning is being raised to the driver as a result of the non-holding state continuing for more than or equal to the second time, the first starting condition of the LCA does not become satisfied even when the LTA is being performed and therefore the LCA cannot be started. Therefore, when the driver demands a performance of the LCA, the driver comes to hold the steering wheel (strictly, comes to hold the steering wheel so that the non-holding duration time does not become more than or equal to the second time) in order for the warning not to be raised (that is, in order for the second non-holding condition not to be satisfied). Hence, it becomes possible to more surely urge the driver to hold the steering wheel during a performance of the LTA.

A second steering assist apparatus of the present invention (hereinafter, may be referred to as a "second invention apparatus") is applied to a vehicle.

This second invention apparatus comprises;

lane recognition means (12) for recognizing a lane to acquire lane information including a relative positional relationship of the vehicle with respect to the lane;

steering assist control means (10, 20) for performing a lane tracing assist control to assist a driver with a steering operation by changing a steered angle of a steered wheel of the vehicle such that a traveling position of the vehicle is kept at a predetermined position in a lane in a lane width direction based on the lane information and a lane changing assist control to assist the driver with the steering operation by changing the steered angle such that the vehicle changes a lane from an original lane on which the vehicle is currently traveling to a target lane adjacent to the original lane based on the lane information;

non-holding detection means (42) for detecting a non-holding state which is a state where the driver of the vehicle is not holding a steering wheel; and non-holding determination means (S626) for measuring a non-holding duration time which is a time for which the non-holding state is continuing during a performance of either the lane tracing assist control or the lane changing assist control to determine whether or not a first non-holding condition that the non-holding duration time is more than or equal to a predetermined first time (tu) is satisfied, wherein, the steering assist control means (10, 20) is configured to;

during a performance of the lane tracing assist control, stop the lane tracing assist control (S628) when the first non-holding condition is determined to be satisfied (S626: Yes), and during a performance of the lane changing assist control, continue the lane changing assist control until a completion condition of the lane changing assist control becomes satisfied regardless of the non-holding duration time; and not perform the lane tracing assist control (S628) when the first non-holding condition is determined to be satisfied (S626: Yes) at a point in time when the completion condition of the lane changing assist control has been satisfied (S620: Yes).

In the second invention apparatus, during a performance of the LCA, the steering assist control means continues the LCA until the completion condition of the LCA becomes satisfied regardless of the non-holding duration time. That is, during a performance of the LCA, "continuing the LCA to the end (until the LCA completion condition becomes satisfied)" is prioritized over "urging the driver to hold the steering wheel by stopping the LCA based on the non-holding duration time". Besides, the steering assist control means performs the LTA when it is determined that the first non-holding condition is not satisfied at a point in time when the LCA completion condition has been satisfied, whereas does not perform the LTA when it is determined that the first non-holding condition is satisfied at this point in time. In a latter case, the driver comes to hold the steering wheel by noticing that the LTA has not been performed. Therefore, according to this configuration, it becomes possible to urge the driver to hold the steering wheel at a relatively early timing (that is, a timing at which the LCA completion condition becomes satisfied) when the first non-holding condition had been satisfied during a performance of the LCA, while suppressing the vehicle from deviating from the target lane during a performance of the LCA. Hence, according to the second invention apparatus, the vehicle can properly change the lane by the LCA while suppressing the driver from overestimating the steering assist control by urging the driver to hold the steering wheel during a performance of the steering assist control.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Figure 1:
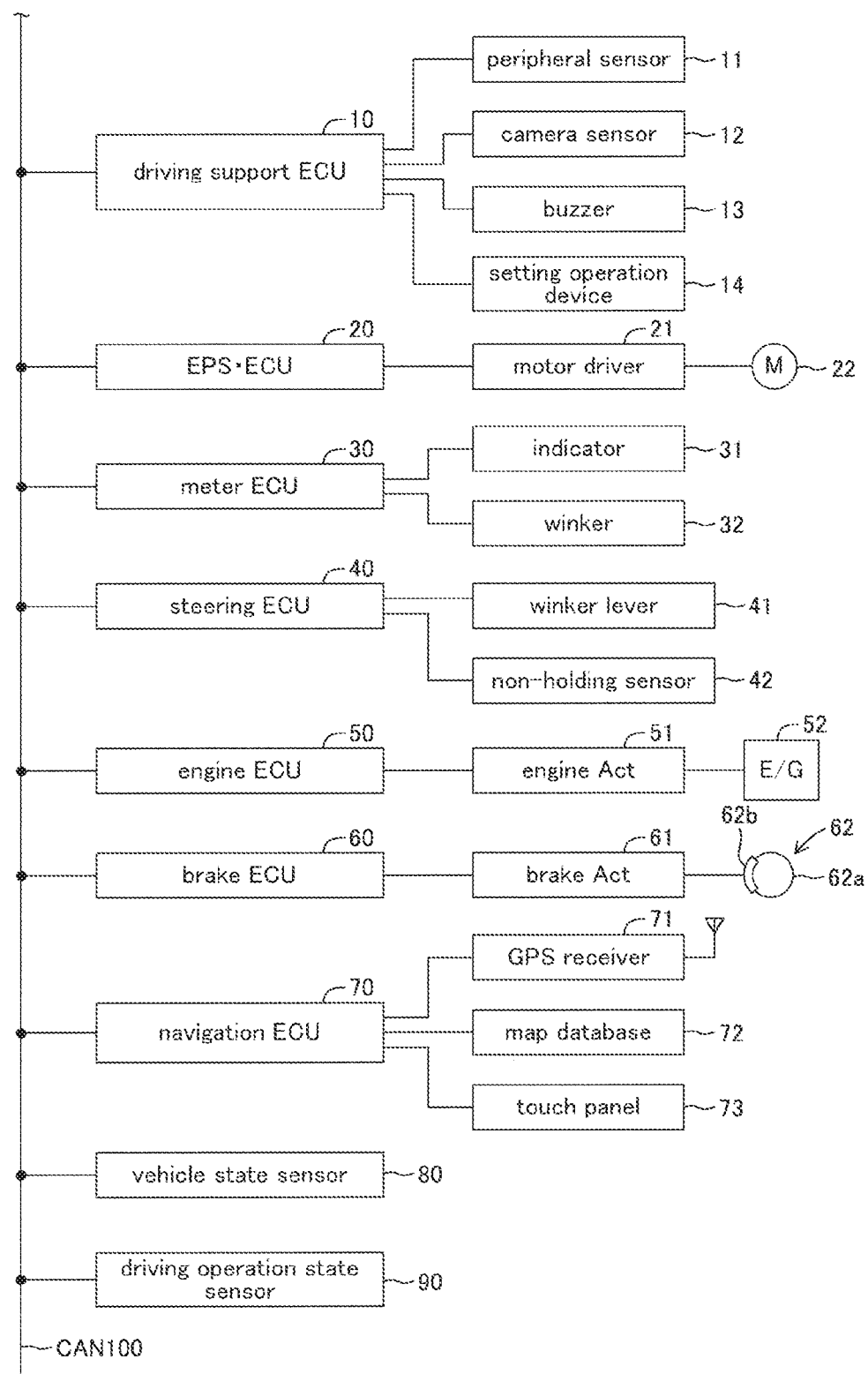
FIG. 1 is a schematic block diagram of a steering assist apparatus (hereinafter, also referred to as a "present embodiment apparatus") according to an embodiment of the present invention.

Hereinafter, a description about a steering assist apparatus according to an embodiment of the present invention (hereinafter, also referred to as a "present embodiment apparatus") will be made, referring figures. The present embodiment apparatus is applied to a vehicle (hereinafter, may be referred to as an "own vehicle" in order to distinguish it from other vehicles), and comprises, as shown in FIG. 1, a driving support ECU 10, an electrically-driven power steering ECU 20, a meter ECU 30, a steering ECU 40, an engine ECU 50, a brake ECU 60, and a navigation ECU 70. Hereinafter the driving support ECU 10 may be also referred to as a "DSECU 10".

Each of the ECUs is an electric control unit comprising a microcomputer as a main part. Those ECUs are connected via CAN (Controller Area Network) 100 so that the ECUs are capable of mutually transmitting and receiving information. In the present specification, the microcomputer includes CPU, ROM, RAM, a non-volatile memory, an interface I/F, or the like. The CPU is configured to realize/perform various functions by executing instructions (i.e., programs or routines) stored in the ROM. Some of those ECUs or all of those ECUs may be integrated to one ECU.

A plurality kinds of vehicle state sensors 80 for detecting states of the vehicle and a plurality kinds of driving operation state sensors 90 for detecting driving operation states are connected to the CAN 100. The vehicle state sensors 80 include a vehicle speed sensor for detecting a traveling speed of the vehicle, a front-rear G sensor for detecting an acceleration of the vehicle in a front-rear direction, a lateral G sensor for detecting an acceleration of the vehicle in a lateral direction, a yaw rate sensor for detecting a yaw rate of the vehicle, and the like.

The driving operation state sensors 90 include an acceleration operation amount sensor for detecting an operation amount of an accelerator pedal, a brake operation amount sensor for detecting an operation amount of a brake pedal, a brake switch for detecting whether or not a brake pedal is operated, a steering angle sensor for detecting a steering angle, a steering torque sensor for detecting a steering torque, a shift position sensor for detecting a shift position of a gear, and the like.

Information detected by the vehicle state sensors 80 and the driving operation state sensors 90 (referred to as a "sensor information") is transmitted to the CAN 100. Each of the ECUs can use the sensor information transmitted to the CAN 100. It should be noted that the sensor information is information of sensors connected to a specific ECU and may be transmitted to the CAN 100 from that specific ECU.

Figure 2:
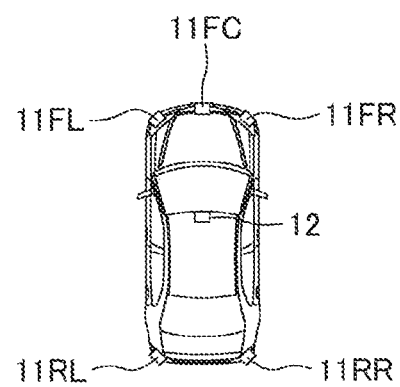
FIG. 2 is a plan view showing each of attached positions of peripheral sensors and a camera sensor.

The DSECU 10 is a central control apparatus to perform various driving supports for the driver, and performs a lane changing assist control (LCA), a lane tracing assist control (LTA), and an adaptive cruise control (ACC). As shown in FIG. 2, a front center peripheral sensor 11FC, a front right peripheral sensor 11FR, a front left peripheral sensor 11FL, a rear right peripheral sensor 11RR, and a rear left peripheral sensor 11RL are connected to the DSECU 10. Each of the peripheral sensors 11FC, 11FR, 11FL, 11RR, 11RL is a radar sensor. Although these sensors have different detection regions, they basically have same configurations with each other. Hereinafter, when there is no need to distinguish each of the peripheral sensors 11FC, 11FR, 11FL, 11RR, 11RL from each other, they are combined to be called a peripheral sensor 11. It should be noted that the LCA and the LTA are controls for assisting steering operations of the driver, and therefore the LCA and the LTA are combined to be called a "steering assist control".

The peripheral sensor 11 comprises a radar transmission/reception part and a signal processing part (illustration omitted). The radar transmission/reception part emits an electric wave in a millimeter waveband (hereinafter, referred to as a "millimeter wave"), and receives a millimeter wave (i.e., a reflected wave) reflected from a three-dimensional object which is present in the emitted area (for example, another vehicle, a pedestrian, a bicycle, a building, and the like). The signal processing part acquires information (hereinafter, referred to as "peripheral information") indicating a distance between the own vehicle and the three-dimensional object, a relative speed between the own vehicle and the three-dimensional object, a relative position (direction) of the three-dimensional object with respect to the own vehicle, and the like every time a predetermined interval elapses to provide the DSECU 10 with the acquired information. The peripheral information enables to detect a front-rear direction component and a lateral direction component of the distance between the own vehicle and the three-dimensional object as well as the front-rear direction component and the lateral direction component of the relative speed between the own vehicle and the three-dimensional object.

As shown in FIG. 2, the front center peripheral sensor 11FC is provided at a front center part of a vehicle body, and detects a three-dimensional object present in a front region of the own vehicle. The front right peripheral sensor 11FR is provided at a front right corner part of the vehicle body, and mainly detects a three-dimensional object present in a front right region of the own vehicle. The front left peripheral sensor 11FL is provided at a front left corner part of the vehicle body, and mainly detects a three-dimensional object present in a front left region of the own vehicle. The rear right peripheral sensor 11RR is provided at a rear right corner part of the vehicle body, and mainly detects a three-dimensional object present in a rear right region of the own vehicle. The rear left peripheral sensor 11RL is provided at a rear left corner part of the vehicle body, and mainly detects a three-dimensional object present in a rear left region of the own vehicle.

Besides, a camera sensor 12 is connected to the DSECU 10. The camera sensor 12 comprises a camera part and a lane recognition part for analyzing an image data acquired by the camera part photographing to recognize a white line on a road. The camera sensor 12 (the camera part) photographs a scenery in front of the own vehicle. The camera sensor 12 (the lane recognition part) provides the DSECU with information regarding the recognized white line every time a predetermined calculation interval elapses.

The camera sensor 12 is configured to recognize a lane indicating a region defined by white lines and detect, based on a positional relationship between the white lines and the own vehicle, a relative positional relationship of the own vehicle with respect to the lane. Here, a position of the own vehicle means a position of a center of gravity of the own vehicle. However, the position of the own vehicle may be a center position of the own vehicle in a plan view. Besides, a lateral position of the own vehicle which will be described later means a position of the center of gravity of the own vehicle in a lane width direction, a lateral speed of the own vehicle means a speed of the center of gravity of the own vehicle in a lane width direction, and a lateral acceleration of the own vehicle means an acceleration of the center of gravity of the own vehicle in a lane width direction. These values can be calculated based on the relative positional relationship between the white lines detected by the camera sensor 12 and the own vehicle.

Figure 3:
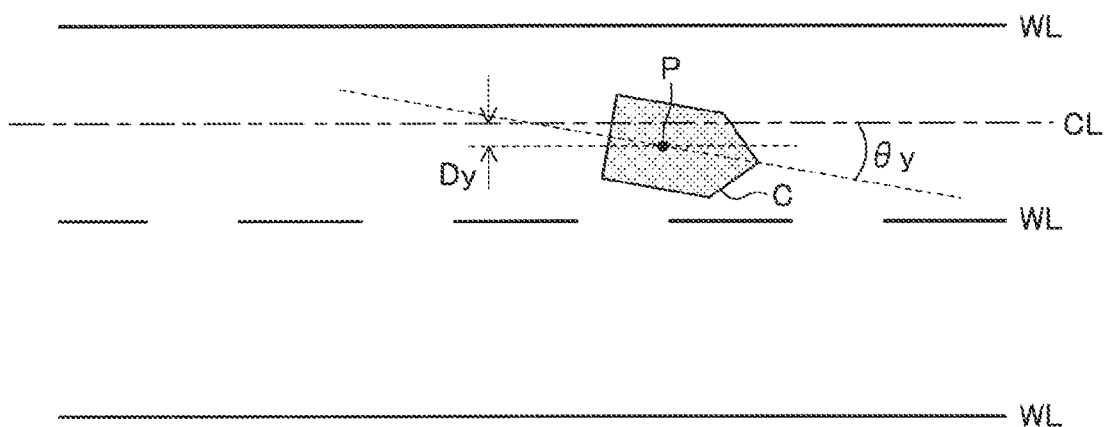
FIG. 3 is a diagram for describing lane related vehicle information.

As shown in FIG. 3, the camera sensor 12 determines a lane center line CL which is a center position in a width direction of left and right white lines WL of the lane on which the own vehicle is traveling. This lane center line CL is used as a target traveling line in the LTA which will be described later. Further, the camera sensor 12 calculates a curvature Cu of a curve of the lane center line CL. It should be noted that although the target traveling line is the lane center line CL in the present embodiment, a line offset from the lane center line CL by a predetermined distance in the lane width direction may be adopted as the target traveling line.

In addition, the camera sensor 12 calculates a position and a direction of the own vehicle on the lane defined by the left and right white lines WL. For example, as shown in FIG. 3, the camera sensor 12 calculates a distance Dy [m] between a center-of-gravity point P of the own vehicle C and the lane center line CL in the lane width direction, that is, a distance Dy by which the own vehicle C is deviated from the lane center line CL in the lane width direction. Hereinafter, the distance Dy is referred to as a lateral deviation Dy. Besides, the camera sensor 12 calculates an angle θy [rad] formed by a direction of the lane center line CL and a direction in which the own vehicle C is oriented. Hereinafter, the angle θy is referred to as a yaw angle θy. When the lane is curved, the lane center line CL is also curved, and therefore the yaw angle θy in this case means an angle by which a direction in which the own vehicle C is oriented is deviated from this curved lane center line CL. Hereinafter, information (Cu, Dy, θy) showing the curvature Cu, the lateral deviation Dy, and the yaw angle θy is referred to as a lane related vehicle information. It should be noted that left and right directions with respect to the lane center line CL regarding the lateral deviation Dy and the yaw angle θy are distinguished by positive and negative signs. In addition, directions toward which a road is curved (left and right) regarding the curvature Cu are distinguished by positive and negative signs.

Further, the camera sensor 12 provides the DSECU 10 with information regarding white lines of not only the lane of the own vehicle but also the adjacent lane, the information including a type of a white line detected (a solid line, a broken line), a distance between adjacent left and right white lines (a width of a lane), a shape of a white line, and the like every time the predetermined calculation interval elapses. When the white line is a solid line, it is prohibited for the own vehicle to change a lane by striding over that white line. On the other hand, when the white line is a broken line (a white line formed intermittently at a constant interval), it is permitted for the own vehicle to change a lane by striding over that white line. The lane related vehicle information (Cu, Dy, θy) and the information regarding white lines are combined to be called a lane information.

It should be noted that although the camera sensor 12 calculates the lane related vehicle information (Cu, Dy, θy) in the present embodiment, the DSECU 10 may acquire the lane information instead by analyzing the image data output by the camera sensor 12.

As shown in FIG. 1, a buzzer (a warning sound generating apparatus, a warning apparatus) 13 is connected to the DSECU 10. The buzzer 13 sounds when receiving a sounding buzzer signal from the DSECU 10. The DSECU 10 sounds the buzzer 13 in cases when notifying the driver of a driving assist state, warning (alerting) the driver, and so on.

Besides, in place of or in addition to the buzzer 13, a vibrator (a warning apparatus) to transmit a warning (alerting) vibration to the driver may be provided. For example, the vibrator is provided at a steering wheel and/or a seat and warns the driver through the vibration of the steering wheel and/or the seat. Further, in place of or in addition to the buzzer 13, an indicator (a warning apparatus) to indicate a message of warning (alerting) to the driver may be provided.

The DSECU 10 performs the ACC, the LTA, and the LCA based on the following information such as the peripheral information provided by the peripheral sensor 11, the lane information acquired based on a white line recognition by the camera sensor 12, the vehicle state detected by the vehicle state sensor 80, the driving operation states detected by the driving operation state sensor 90, and the like.

A setting operation device 14 operated by the driver is connected to the DSECU 10. The setting operation device 14 is a device to perform settings and the like of whether or not to perform each of the ACC, LTA, and the LCA. The DSECU 10 inputs a setting signal of the setting operation device 14 to determine whether or not to perform each of the controls. The setting operation device 14 is automatically set in such a manner that the LTA and the LCA are not to be performed when a performance of the ACC has not been selected. Besides, the setting operation device 14 is automatically set in such a manner that the LCA is not to be performed when a performance of the LTA has not been selected.

The electric power steering ECU 20 is a control apparatus of an electric power steering apparatus. Hereinafter, the electric power steering ECU 20 is referred to as an EPS•ECU (Electric Power Steering ECU) 20. The EPS•ECU 20 is connected to a motor driver 21. The motor driver 21 is connected to a steered motor 22. The steered motor 22 is incorporated into a non-illustrated steering mechanism of the vehicle including "the steering wheel, a steering shaft coupled to the steering wheel, a steering gear mechanism, and the like". The EPS•ECU 20 detects a steering torque which the driver input to a steering wheel (illustration omitted) by using a steering torque sensor arranged at a steering shaft. The EPS•ECU 20 controls an electric conduction of the motor driver 21 based on the detected steering torque and drives the steered motor 22. When the steered motor 22 is driven, a steered angle of a non-illustrated steered wheel of the own vehicle is changed (the steered wheel is steered). A steering torque is applied to the steering mechanism by driving this assisting motor, assisting the steering operation of the driver.

Besides, when the EPS•ECU 20 receives a steering instruction from the DSECU 10 via the CAN 100, the EPS•ECU 20 drives the steered motor 22 with a control amount specified by the steering instruction to generate a steering torque. This steering torque is different from the steering assist torque applied in order to lighten the aforementioned steering operation (a steering wheel operation) by the driver, but is applied to the steering mechanism by the steering instruction from the DSECU 10 without the steering operation by the driver. This torque changes the steered angle of the steered wheel of the own vehicle (the steered wheel is steered).

It should be noted that when a steering torque by a steering wheel operation by the driver is detected and this steering torque is larger than a threshold, even when the EPS•ECU 20 receives a steering instruction from the DSECU 10, the EPS•ECU 20 prioritize the steering wheel operation by the driver and generate the steering assist torque to lighten this operation.

The meter ECU 30 is connected to an indicator 31 and left and right winkers 32. The left and right winkers 32 are winker lamps and may also be called turn lamps. The indicator 31 is, for example, a multi information display provided at a front of a driver's seat and indicates various types of information in addition to measured values such as a vehicle speed and the like by a meter. For instance, when receiving an indication instruction corresponding to a driving assist state from the DSECU 10, the meter ECU 30 indicates an image designated by the indication instruction on the indicator 31. It should be noted that a head-up display (illustration omitted) may be adopted as the indicator 31 in place of or in addition to the multi information display.

The meter ECU 30 comprises a winker driving circuit (illustration omitted). When the meter ECU 30 receives a winker blinking instruction via the CAN 100, the meter ECU 30 blinks one of the winkers 32 corresponding to a direction/side (right or left) designated by the winker blinking instruction. Hereinafter, one of the winkers 32 may be also simply referred to as "the winker 32". While blinking the winker 32, the meter 30 transmits winker blinking information indicating that the winker 32 is blinking to the CAN 100. Thereby, other ECUs can grasp a blinking state of the winker 32.

The steering ECU 40 is connected to a winker lever 41 and a non-holding sensor 42. The winker lever 41 is an operation device to operate (blink) the winkers 32 and is provided at a steering column. The winker lever 41 is provided in a revolvable way with two steps of operation strokes around a spindle for each of a counterclockwise operation direction and a clockwise operation direction.

Figure 4:
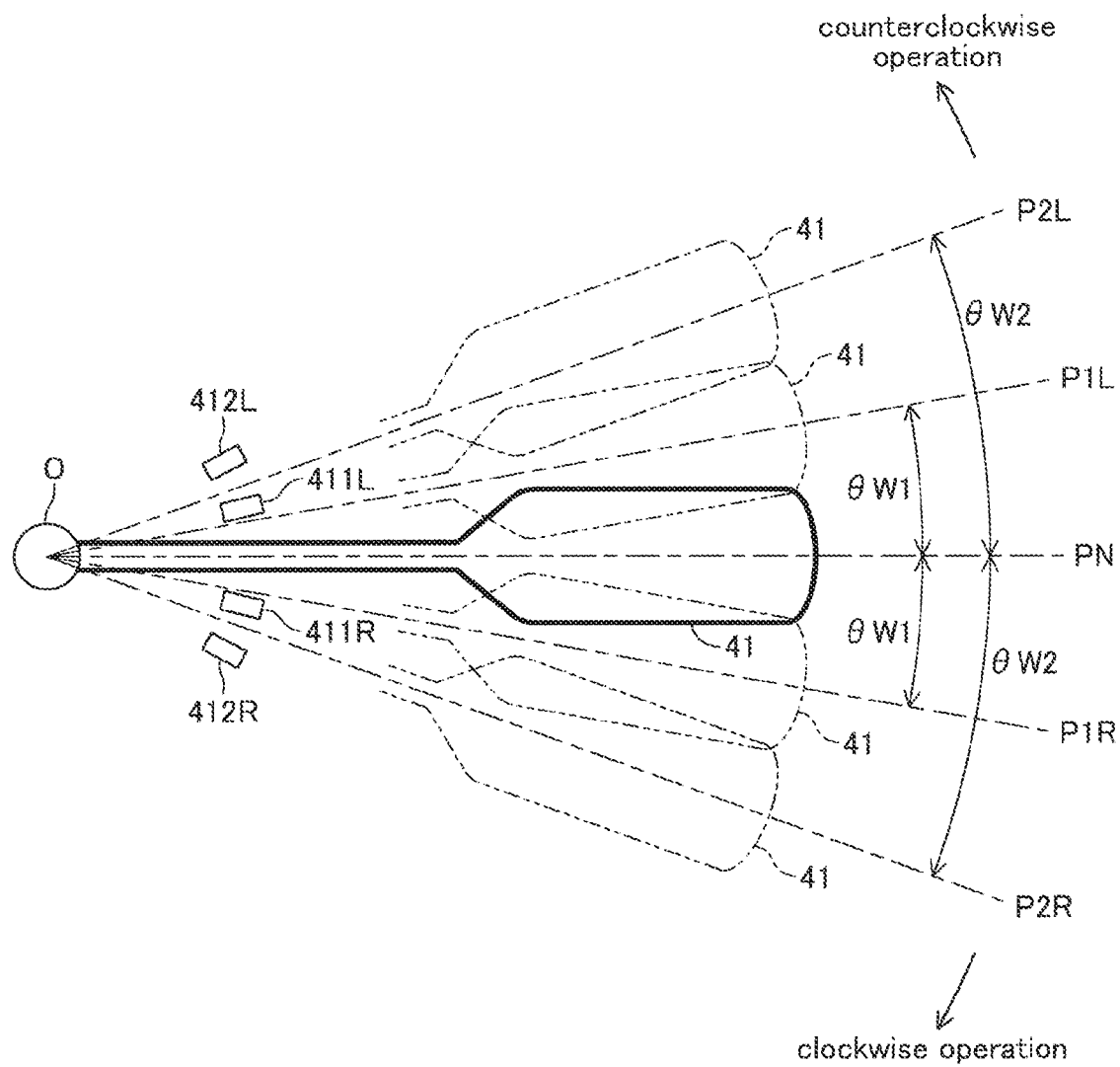
FIG. 4 is a diagram for describing operations of a winker lever.

The winker lever 41 in the present embodiment also functions as an operation device with which the driver requests the LCA. As shown in FIG. 4, the winker lever 41 is configured to be selectively operatable, for each of the counterclockwise operation direction and the clockwise operation direction around the spindle O, among a first stroke position P1L (P1R) which is a position to which the winker lever 41 is revolved from a neutral position PN by a first angle $\theta W1$ and a second stroke position P2L (P2R) which is a position to which the winker lever 41 is revolved from the neutral position PN by a second angle $\theta W2$ ($>\theta W1$). In a case where the winker lever 41 is shifted by a lever operation by the driver to the first stroke position P1L (P1R), the winker lever 41 is configured to move back to the neutral position PN once an operation force on the winker lever 41 by the driver is released. Further, in a case where the winker lever 41 is shifted by the lever operation by the driver to the second stroke position P2L (P2R), the winker lever 41 is configured to be retained at the second stroke position P2L (P2R) by a lock mechanism even when the operation force on the winker lever 41 is released. In addition, when the winker lever 41 which is in a state of being retained at the second stroke position P2L (P2R) is moved back to the neutral position PN by the steering wheel rotating in an opposite direction or when the driver performs an operation to move the winker lever 41 back toward a neutral position direction, the winker lever 41 is configured to move back to the neutral position PN by the lock mechanism being unlocked.

The winker lever 41 comprises a first switch 411L (411R) which is turned on (generates an on signal) only when a position thereof is at the first stroke position P1L (P1R) and a second switch 412L (412R) which is turned on (generates an on signal) only when a position thereof is at the second stroke position P2L (P2R).

The steering ECU 40 detects an operation state of the winker lever 41 based on whether or not there is the on signal from the first switch 411L (411R) or the second switch 412L (412R). The steering ECU 40 transmits to the meter ECU 30 the winker blinking instruction including information indicating an operation direction (left or right) of the winker lever 41 for each of the cases where the winker lever 41 is shifted to the first stroke position P1L (P1R) and the winker lever 41 is shifted to the second stroke position P2L (P2R).

In addition, when the steering ECU 40 detects that the winker lever 41 has been successively retained at the first stroke position P1L (P1R) for more than or equal to a predetermined set time (a lane changing request confirmation time: 1 sec, for instance), the steering ECU 40 outputs to the DSECU 10 an LCA request signal including information indicating the operation direction (left or right) of the winker lever 41. Therefore, when the driver demands a performance of the LCA during driving, the driver may shift the winker lever 41 to the first stroke position P1L (P1R) in a lane changing direction and retain that state for more than or equal to the set time. Hereinafter, an operation described above is referred to as an LCA request operation.

It should be noted that the winker lever 41 is used as an operation device with which the driver requests the LCA in the present embodiment. However, a dedicated LCA request operation device may be provided at the steering wheel and the like instead.

The non-holding sensor 42 is a capacitance sensor provided inside the steering wheel. The non-holding sensor 42 detects a state where the driver is not holding the steering wheel (hereinafter, also referred to as a "non-holding state") by detecting a capacitance of when the driver is holding the steering wheel and a capacitance of when the driver is not holding the steering wheel. When the non-holding sensor 42 detects the non-holding state, the non-holding sensor 42 transmits to the DSECU 10 via the CAN 100 a non-holding detection signal indicating that the non-holding state is occurring.

When the transmission of the non-holding detection signal from the non-holding sensor 42 is started, the DSECU 10 activates a count timer tn (an initial value: zero) to start counting up a time for which the non-holding detection signal is transmitted. This counting up is performed only while the steering assist control (LCA, LTA) is being performed. That is, the DSECU 10 does not perform the counting up while the steering assist control is not being performed even when the non-holding detection signal is transmitted from the non-holding sensor 42.

When the transmission of the non-holding detection signal is stopped (that is, when the driver holds the steering wheel), the DSECU 10 resets a value of the count timer tn. That is, the value of the count timer tn indicates "a time for which the non-holding state is continuing during a performance of the steering assist control". Hereinafter, this time is also referred to as a "non-holding duration time". On the other hand, when the steering assist control is stopped in the midst of the transmission of the non-holding detection signal (that is, in the midst of counting up), the DSECU 10 does not reset the value of the count timer tn but retains a value of a point in time when the steering assist control has been stopped. This value of the count timer tn is retained until the transmission of the non-holding detection signal is stopped (that is, until a value of the count timer tn is reset). Besides, the value of the count timer tn is reset at a point in time when an engine switch is turned off. It should be noted that the capacitance sensor is used as the non-holding sensor 42 in the present embodiment. However, a steering torque sensor may be used for instance instead of the capacitance sensor. Alternatively, a configuration where a camera to photograph the driver is provided in a vehicle cabin and the non-holding state is detected based on an image photographed by the camera may be adopted.

It should be noted that the DSECU 10 does not measure the non-holding duration time by the types of the steering assist control, but measures the non-holding duration time regardless of the types of the steering assist control during a period of the steering assist control being performed. That is, even when the types of the steering assist control is switched (namely, even when the steering assist control is switched from the LTA to the LCA or vice versa) in the midst of the DSECU 10 measuring the non-holding duration time, the DSECU 10 continues to measure the non-holding duration time without resetting it.

Referring back to FIG. 1, the engine ECU 50 is connected to an engine actuator 51. The engine actuator 51 includes actuators to change a driving state of an internal combustion engine 52. The engine ECU 50 can change torque which the internal combustion engine 52 generates by driving the engine actuator 51. Thereby, the engine ECU 50 can control a driving force of the own vehicle so as to change an acceleration state (an acceleration rate).

The brake ECU 60 is connected to a brake actuator 61. The brake actuator 61 adjusts, in response to an instruction from the brake ECU 60, an hydraulic pressure that is supplied to a wheel cylinder which is built in the brake caliper 62b. Thereby, the brake actuator 61 presses a brake pad onto the brake disc 62a to generate a friction braking force. Accordingly, the brake ECU 60 can control a braking force of the own vehicle to change a deceleration state (a deceleration rate) by controlling the brake actuator 61.

The navigation ECU 70 is connected to a GPS receiver 71, a map database 72, a touch panel (a touch-screen display) 73, and so on. The GPS receiver 71 receives a GPS signal to detect a current position of the own vehicle. The map database 72 stores map information etc. The navigation ECU 70 identifies the current position of the own vehicle based on the GPS signal, and performs various types of processing based on the own vehicle position and on the map information etc. stored in the map database 72 to perform a route guidance using the touch panel 73.

The map information stored in the map database 72 includes road information. The road information includes parameters representing a position and a shape of a road (for example, a curvature radius of a road, a curvature, a lane width of a road, the number of lanes, a position of a center line of each lane, and the like). In addition, the road information includes road types information etc. which enables to distinguish whether or not a road is a highway (a road exclusively used by vehicles).

<Control Processing Performed by the DSECU 10>

Subsequently, control processing performed by the DSECU 10 will be described. The DSECU 10 performs the ACC, the LTA, and the LCA. Therefore, these controls will be described first.

[ACC (Adaptive Cruise Control)]

The ACC performs following controls based on the peripheral information. That is, in a case when there exists a preceding vehicle traveling right ahead the own vehicle, the ACC makes the own vehicle trail the preceding vehicle, maintaining an inter-vehicular distance between the preceding vehicle and the own vehicle at a predetermined distance, and in a case when there does not exist such a preceding vehicle, the ACC makes the own vehicle travel at a constant speed set in advance. The ACC itself is well known (for example, refer to Japanese Patent Applications Laid-Open (kokai) No. 2014-148293 and No. 2006-315491, and Japanese Patents No. 4172434, and No. 4929777 and so on.) Therefore, a simple description will be made below.

When the ACC is being requested by an operation of the operation device 14, the DSECU 10 performs the ACC. When the ACC is being requested, the DSECU 10 selects a trailing target vehicle based on the peripheral information provided from the peripheral sensor 11. For example, the DSECU 10 determines whether or not there exists another vehicle within a predetermined trailing target vehicle area.

When the other vehicle has been present within the trailing target vehicle area over more than or equal to a predetermined time, the DSECU 10 selects this other vehicle as a trailing target vehicle, and sets a target acceleration in such a manner that the own vehicle trails the trailing target vehicle, maintaining a predetermined inter-vehicular distance to the trailing target vehicle. On the other hand, when the other vehicle is not present within the trailing target vehicle area, the DSECU 10 sets a target acceleration based on the set vehicle speed and the detected vehicle speed (the vehicle speed detected by the vehicle speed sensor) in such a manner that the vehicle speed of the own vehicle coincides with the set vehicle speed.

The DSECU 10 controls the engine actuator 51 using the engine ECU 50, and when necessary, controls the brake actuator 61 using the brake ECU 60 so that the acceleration of the own vehicle coincides with the target acceleration. It should be noted that when an acceleration operation is performed by the driver during the ACC and as a result a requested acceleration based on this acceleration operation has exceeded the target acceleration, the acceleration operation is prioritized (acceleration override) and the ACC is not performed. The ACC is automatically resumed after the acceleration override. This is a summary of the ACC.

[LTA (Lane Tracing Assist Control)]

The LTA is a control to support the steering operation (the lane tracing operation) by the driver by adding the steering torque to the steering mechanism so that a position of the own vehicle is kept nearby (in the vicinity of) a target traveling line in a "lane on which the own vehicle is traveling". The LTA itself is well known (for example, refer to Japanese Patent Applications Laid-Open (kokai) No. 2008-195402, No. 2009-190464, No. 2010-6279, and Japanese Patent No. 4349210, and so on). Therefore, a simple description will next be made below.

The DSECU 10 starts the LTA when an LTA starting condition is satisfied. For example, the LTA starting condition is satisfied when following conditions are all satisfied.

1. A performance of the LTA has been selected with the setting operation device 14.

2. The ACC is being performed.

3. The while lines have been able to be recognized by the camera sensor 12.

4. A value of the count timer to has been reset (described later).

It should be noted that the LTA starting condition is not limited to the conditions above but can be set arbitrarily.

When the LTA starting condition is satisfied, the DSECU 10 calculates a target steered angle $\theta lta^*$ based on the aforementioned lane related vehicle information (Cu, Dy, $\theta y$) every time the predetermined calculation interval elapses to output to the EPS•ECU 20 an instruction signal indicating the target steered angle $\theta lta^*$. The EPS•ECU 20 controls driving of the steered motor 22 so that the steered angle follows the target steered angle $\theta lta^*$.

Besides, when the own vehicle comes into a situation where the own vehicle deviates out of the lane, the DSECU 10 raises a lane deviation warning by sounding the buzzer 13 and so on. This is a summary of the LTA.

[LCA (Lane Changing Assist Control)]

The LCA is a control to assist the steering operation (the lane changing operation) by the driver by applying a steering torque to the steering mechanism so that the own vehicle moves to an adjacent lane from a lane on which the own vehicle is currently traveling while monitoring a periphery of the own vehicle after being determined that a safe lane change is possible as a result of monitoring the periphery of the own vehicle. The LCA itself is well known (for example, refer to Japanese Patent Applications Laid-Open (kokai) No. 2016-207060, No. 2017-74823, and so on). Therefore, a simple description will next be made below.

The DSECU 10 starts the LCA when an LCA starting condition is satisfied. For example, the LCA starting condition is satisfied when following conditions are all satisfied.

1. The LCA request operation (the LCA request signal) is detected.
2. A performance of the LCA has been selected with the setting operation device 14.
3. The LTA is being performed.
4. A non-holding warning has not been raised during the performance of the LTA (described later).
5. A white line positioned in the winker operation direction (a white line positioned between the original lane and the target lane) is a broken line.
6. A determination result of whether or not the LCA can be performed according to the monitoring of the periphery is positive (That is, based on the peripheral information acquired by the peripheral sensor 11, no obstacles (other vehicles etc.) which may interfere with the lane change has been detected, and it has been determined that a safe lane change is possible).
7. A road is a highway (a road exclusively used by vehicles). In other words, the road types information acquired from the navigation ECU 70 indicates that a road is a highway.
8. A vehicle speed of the own vehicle is in an LCA permission vehicle speed range where the LCA is permitted. For example, the condition 8 is satisfied when it is estimated that an inter-vehicular distance between the own vehicle and an other vehicle traveling on the target lane after the lane change is properly ensured based on a relative speed between the own vehicle and the other vehicle.

It should be noted that the LCA starting condition is not limited to the conditions above but can be set arbitrarily.

Figure 5:
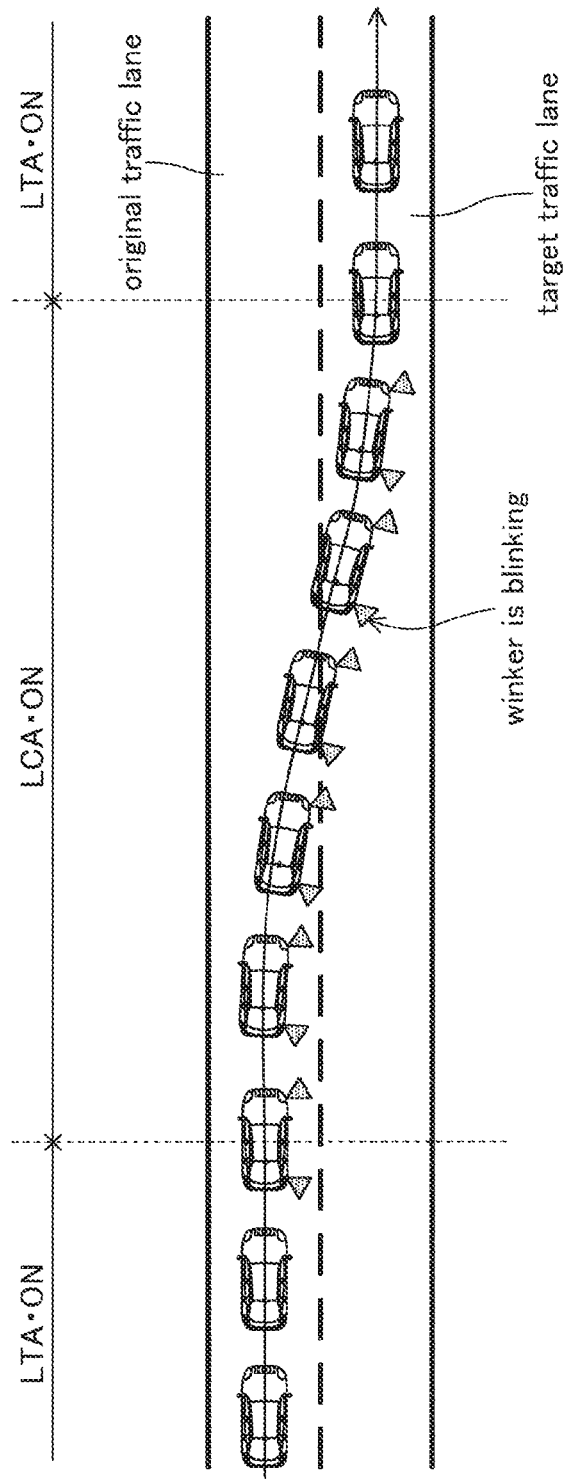
FIG. 5 is a diagram showing a target locus.

When the LCA starting condition is satisfied, the DSECU 10 calculates a target locus function y(t) to determine a target locus of the own vehicle. The target locus is a locus on which the own vehicle moves from the lane on which the own vehicle is currently traveling (that is, the original lane) to a central position (referred to as a final target lateral position) in the width direction of the lane adjacent to the original lane and is positioned in an LCA requested direction (that is, the target lane), taking a target-time-required-for-a-lane-change. The target locus has a shape shown in FIG. 5, for example.

The target locus function y(t) is defined by using an elapsed time t from an LCA starting point in time (that is, a point in time when the LCA starting condition has been satisfied) as a variable. The target locus function y(t) calculates a target value of the lateral position (that is, a target lateral position) of the own vehicle corresponding to the elapsed time t on a basis of the lane center line CL of the original lane. Here, the lateral position of the own vehicle means a position of the center of gravity of the own vehicle in the lane width direction (that is, the lateral direction) on the basis of the lane center line CL.

The target-time-required-for-a-lane-change is set in such a manner that the target-time-required-for-a-lane-change may vary in proportion to a distance necessary to move the own vehicle in the lateral direction from an initial lateral position which is a starting position of the LCA (a lateral position of the own vehicle at the LCA starting point in time) to the final target lateral position. Hereinafter, this distance is referred to as a "necessary lateral distance".

The target locus function is determined based on a state of the own vehicle at the LCA starting point in time, a target state of the own vehicle at an LCA completion point in time, and the target-time-required-for-a-lane-change. Here, "the state of the own vehicle at the LCA starting point in time" includes "the initial lateral position, a lateral speed at the initial lateral position, and a lateral acceleration at the initial lateral position of the own vehicle". Besides, "the target state of the own vehicle at the LCA completion point in time" includes "the final target lateral position, a lateral speed at the final target lateral position (that is, zero), and a lateral acceleration at the final target lateral position (that is, zero) of the own vehicle". The target locus determined in this way has a shape on which the own vehicle can smoothly travel to the final target lateral position.

The DSECU 10 stores this target locus function y(t) and performs the steering control based on the target locus function y(t) until the LCA finishes. Specifically, the DSECU 10 calculates the target steered angle θlca* by performing following processing every time the predetermined calculation interval elapses. That is, the DSECU 10 calculates a target lateral position y*, a target lateral speed vy*, and a target lateral acceleration ay* at a current point in time based on the target locus function y(t) and the elapsed time t. Subsequently, the DSECU 10 calculates a target yaw angle θy*, a target yaw rate γ*, and a target curvature Cu* at the current point in time based on the vehicle speed v, the target lateral speed vy*, and the target lateral acceleration ay* at the current point in time. Thereafter, the DSECU 10 calculates the target steered angle θlca* based on the target lateral position y*, the target yaw angle θy*, the target yaw rate γ*, and the target curvature Cu*. It should be noted that the LCA finishes when an LCA completion condition that the lateral position of the own vehicle reaches the final target lateral position is satisfied.

Upon a calculation of the target steered angle θlca*, the DSECU 10 outputs to the EPS•ECU 20 an instruction signal indication the target steered angle θlca*. The EPS•ECU 20 controls driving of the steered motor 22 so that the steered angle follows the target steered angle θlca*. This is a summary of the LCA.

It should be noted that the present embodiment apparatus performs a control to assist (support) the steering operation by the driver. Therefore, when performing the steering assist control (LTA, LCA), the DSECU 10 generates a steering force for the steering assist control such that the steering wheel operation by the driver is prioritized. Thereby, the driver can drive the own vehicle in a direction to which the driver intends to drive with his/her own steering wheel operation.

Next, processing by the DSECU 10 corresponding to the non-holding duration time will be described. The DSECU 10 determines whether or not the non-holding duration time (a time for which the non-holding state is continuing during a performance of the steering assist control) is more than or equal to a non-holding warning time tw set in advance (10 seconds, for example) every time the predetermined calculation interval elapses. When it is determined that the non-holding duration time is more than or equal to the non-holding warning time tw, the DSECU 10 determines that a non-holding-condition-for-warning is satisfied and sounds the buzzer 13 to warn (alert) the driver. This warning is referred to as a non-holding warning. It should be noted that the non-holding warning time tw may be a variable which decreases as the vehicle speed increases. Besides, the "non-holding warning time tw" corresponds to one example of a "second time", and the "non-holding-condition-for-warning" corresponds to one example of a "second non-holding condition".

Besides, the DSECU 10 determines whether or not the non-holding duration time is more than or equal to a non-holding upper limit time tu set in advance every time the predetermined calculation interval elapses. This non-holding upper limit time tu is set to be a larger value than the non-holding warning time tw (13 seconds, for example). When it is determined that the non-holding duration time is more than or equal to the non-holding upper limit time tu, the DSECU 10 determines that a non-holding-condition-for-turning-control-off is satisfied. When it is determined that the non-holding-condition-for-turning-control-off is satisfied during a performance of the LTA, the DSECU 10 stops the LTA.

Now, the aforementioned condition 4 of the LTA starting condition will be described. When it is determined that the non-holding-condition-for-turning-control-off is satisfied and the LTA is stopped, the value of the count timer to is not reset but the value of a point in time when the LTA has been stopped is retained as mentioned above. Therefore, in order for the condition 4 of the LTA starting condition to be satisfied, it is required for the driver to hold the steering wheel at least once after the LTA is stopped. In other words, the LTA is not to be resumed during a period where the non-holding state is continuing after the LTA is stopped. When the driver holds the steering wheel after the LTA is stopped, the value of the count timer tn is reset and thus the condition 4 becomes satisfied. A non-holding duration time after the LTA is resumed can be precisely measured by the value of the count timer tn being reset. It should be noted that when the LTA is performed for the first time after the engine switch is turned on, the value of the count timer tn has been reset, and therefore the condition 4 has been automatically satisfied. Hence, the DSECU 10 is configured not to confirm whether or not the condition 4 is satisfied in the aforementioned case.

In contrast, during a performance of the LCA, the DSECU 10 does not stop but continues the LCA to the end regardless of the non-holding duration time. Thereafter, the DSECU 10 determines whether or not the non-holding duration time is more than or equal to the non-holding upper limit time tu at a point in time when the LCA completion condition has been satisfied. When it is determined that the non-holding duration time is less than the non-holding upper limit time tu, the DSECU 10 determines that the non-holding-condition-for-turning-control-off is not satisfied to perform the LTA. That is, the DSECU 10 resumes the LTA after the LCA is finished. On the other hand, when it is determined that the non-holding duration time is more than or equal to the non-holding upper limit time tu, the DSECU 10 determines that the non-holding-condition-for-turning-control-off is satisfied not to perform (resume) the LTA. It should be noted that the non-holding upper limit time tu may be a variable which decreases as the vehicle speed increases. In addition, the "non-holding upper limit time tu" corresponds to one example of a "first time", and the "non-holding-condition-for-turning-control-off" corresponds to one example of a "first condition".

When it is determined that the non-holding-condition-for-warning is satisfied during a performance of the LTA, and the non-holding warning is raised, the condition 4 among the LCA starting condition becomes unsatisfied, and therefore the LCA starting condition becomes unsatisfied. Hence, the DSECU 10 does not start the LCA even when other conditions (the condition 1 to 3 and the conditions 5 to 8) are all satisfied. In addition, when it is determined that the non-holding-condition-for-turning-control-off is satisfied during a performance of the LTA and the LTA is stopped, the conditions 3 and 4 among the LCA starting condition become unsatisfied, and therefore the LCA starting condition becomes unsatisfied. The DSECU 10 does not start the LCA in this case as well. That is, in order for the LCA starting condition to be satisfied, it is required for at least the LTA to be being performed in a state where "the non-holding warning is not being raised" (that is, a state where the non-holding duration time is less than the non-holding warning time tw).

Subsequently, control processing performed by the DSECU 10 will be specifically described, referring to FIG. 6 and FIG. 7. When an ignition switch is turned on, the DSECU 10 performs routines shown by flowcharts in FIG. 6 and FIG. 7 in parallel. It should be noted that hereinafter, a status of the steering assist control (LTA, LCA) is referred to as a "steering assist control state".

Figure 6:
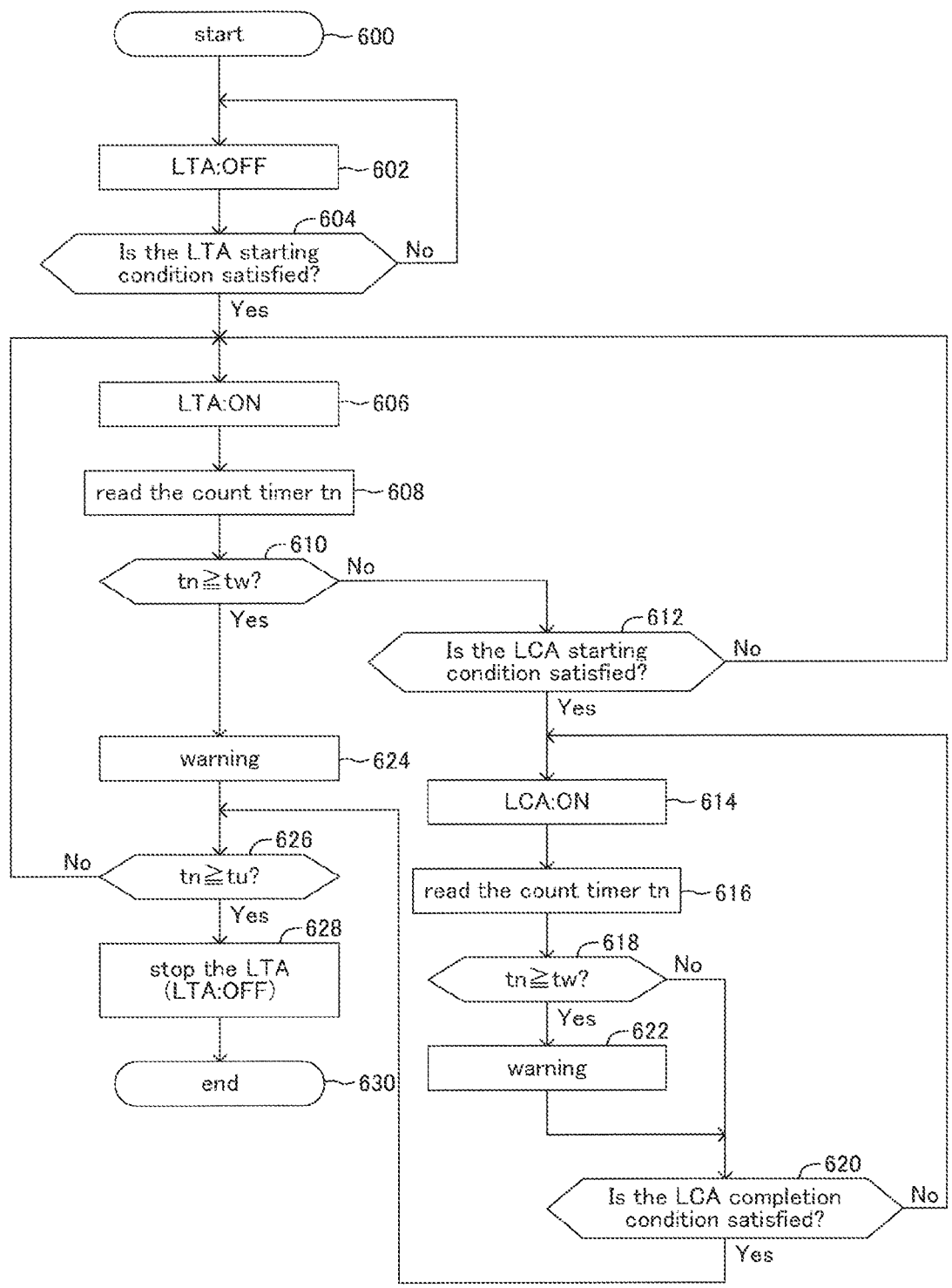
FIG. 6 is a flowchart showing a steering assist routine performed by CPU of driving support ECU of the present embodiment apparatus.

When the DSECU 10 starts processing from a step S600 in FIG. 6 after the ignition switch is turned on, the DSECU 10 sets, at a step S602, the steering assist control state to be an LTA•OFF state. Here, the LTA•OFF state is a control state where the LTA is not being performed.

Next, the DSECU 10 proceeds to a step S604 to determine whether or not the aforementioned LTA starting condition is satisfied. When it is determined that the LTA starting condition is not satisfied (S604: No), the DSECU 10 returns back to the step S602. The DSECU 10 repeats processing of the steps 602 and 604 every time the predetermined calculation interval elapses until the LTA starting condition is determined to be satisfied.

When it is determined that the LTA starting condition is satisfied (S604: Yes) in the midst of the processing mentioned above, the DSECU 10 proceeds to a step S606 to set the steering assist control state to be an LTA•ON state. Here, the LTA•ON state is a control state where the LTA is being performed. In other words, the DSECU 10 starts the LTA.

Subsequently, the DSECU 10 proceeds to a step S608 to read the count timer tn. The count time tn is measured by the routine shown in FIG. 7. Therefore, hereinafter, a measurement with the count timer tn will be described, referring to FIG. 7.

Figure 7:
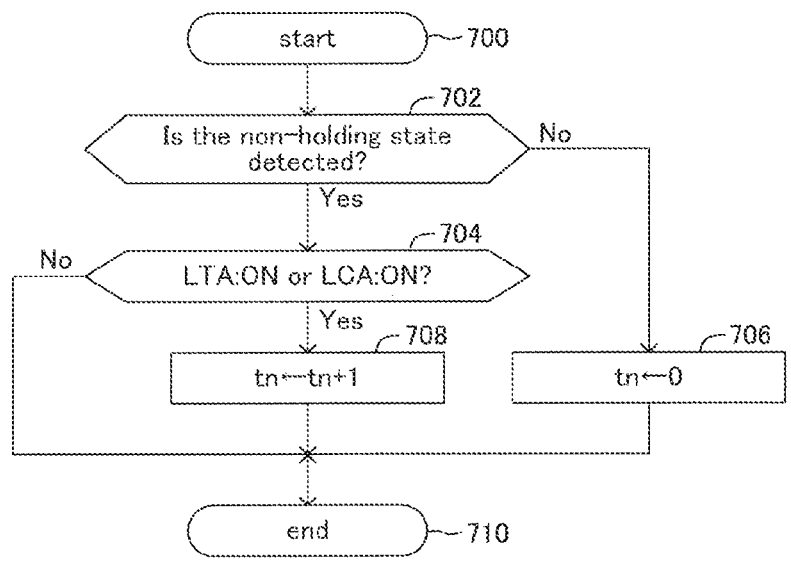
FIG. 7 is a flowchart showing a non-holding duration time measurement routine performed by the CPU of the driving support ECU of the present embodiment apparatus.

When the DSECU 10 starts processing from a step S700 in FIG. 7 after the ignition switch is turned on, the DSECU 10 determines, at a step S702, whether or not the non-holding state is detected. When it is determined that the non-holding state is not detected (that is, the driver is holding the steering wheel), (step S702: No), the DSECU 10 proceeds to a step S706 to reset (zero clear) the value of the count timer tn, and tentatively terminates the routine of FIG. 7 at a step S710. The value of the count timer tn has been set to zero at a point in time when the ignition switch is turned on.

The DSECU 10 repeats the processing mentioned above every time the predetermined calculation interval elapses. When it is determined that the non-holding state is detected at the step S702 (S702: Yes) in the midst of the processing, the DSECU 10 proceeds to a step 704 to determine whether or not the steering assist control state is either the LTA•ON state or an LCA•ON state. Here, the LCA•ON state is a control state where the LCA is being performed. That is, the DSECU 10 determines, at the step S704, whether or not the steering assist control is being performed.

When it is determined that the steering assist control state is either the LTA•ON state or an LCA•ON state (S704: Yes), the DSECU 10 proceeds to a step S708 to increase the value of the count timer tn by 1. Therefore, the value of the count timer tn indicates the non-holding duration time. After finishing the processing of the step S708, the DSECU 10 tentatively terminates the routine of FIG. 7 at the step S710.

The DSECU 10 repeats the processing mentioned above every time the predetermined calculation interval elapses. When it is determined that the steering assist control state is neither the LTA•ON state nor the LCA•ON state (that is, the steering assist control is not being performed) at the step S704 (S704: No) in the midst of the processing, the DSECU 10 tentatively terminates the routine of FIG. 7 at the step S710. That is, when it is determined that the steering assist control is not being performed, the DSECU 10 does not reset the value of the count timer tn but retains the value of that point in time.

The DSECU 10 repeats the processing mentioned above every time the predetermined calculation interval elapses. When it is determined that the non-holding state is not detected (that is, the driver is holding the steering wheel) at the step S702 (S702: No) in the midst of the processing, the DSECU 10 proceeds to the step S706 to reset the value of the count timer tn. That is, the value of the count timer tn retained at the point in time when a "No" determination has been made at the step S704 is reset.

The DSECU 10 repeats the processing mentioned above every time the predetermined calculation interval elapses until the ignition switch is turned off. In this way, the non-holding duration time is measured.

Referring back to FIG. 6, when the DSECU 10 reads the count timer tn at the step S608, the DSECU 10 proceeds to a step S610 to determine whether or not the value of the count timer tn (that is, the non-holding duration time) is more than or equal to the non-holding warning time tw. When it is determined that the non-holding duration time is less than the non-holding warning time tw (S610: No), the DSECU 10 determines that the non-holding-condition-for-warning is not satisfied and proceeds to a step S612.

The DSECU 10 determines, at the step S612, whether or not the aforementioned LCA starting condition is satisfied. When it is determined that the LCA staring condition is not satisfied (S612: No), the DSECU 10 returns to the step S606 to continue the LTA.

The DSECU 10 repeats the processing mentioned above every time the predetermined calculation interval elapses. When it is determined that the LCA staring condition is satisfied (S612: Yes) in the midst of the processing, the DSECU 10 proceeds to the step S614 to set the steering assist control state as the LCA•ON state. That is, the DSECU 10 starts the LCA (performs the LCA in place of the LTA).

Subsequently, the DSECU 10 proceeds to a step S616 to read the count timer tn. Thereafter, the DSECU 10 proceeds to a step S618 to determine whether or not the value of the count timer tn (that is, the non-holding duration time) is more than or equal to the non-holding warning time tw. At a point in time when it has been determined that the LCA starting condition is satisfied at the step S612, tn<tw is satisfied at the step S610, and therefore the non-holding duration time is less than the non-holding warning time tw (S618: No). In this case, the DSECU 10 proceeds to a step S620 to determine whether or not the aforementioned LCA completion condition is satisfied. At the point in time when it has been determined that the LCA starting condition is satisfied at the step S612, the LCA completion condition is not satisfied (S620: No). In this case, the DSECU 10 returns to the step S614 to continue the LCA.

The DSECU 10 repeats the processing mentioned above every time the predetermined calculation interval elapses. When it is determined that the non-holding duration time has reached the non-holding warning time tw at the step S618 (S618: Yes) in the midst of the processing, the DSECU 10 determines that the non-holding-condition-for-warning is satisfied and at a step S622, sounds the buzzer 13 to raise the non-holding warning (alerting) to the driver.

Thereafter, the DSECU 10 proceeds to the step S620 to determine whether or not the LCA completion condition is satisfied. The DSECU 10 repeats the processing mentioned above every time the predetermined calculation interval elapses. When it is determined that the LCA completion condition is satisfied at the step S620 (S620: Yes) in the midst of the processing, the DSECU 10 proceeds to a step S626 to determine whether or not the value of the count timer tn (that is, the non-holding duration time) is more than or equal to the non-holding upper limit time tu.

When it is determined that the non-holding duration time is more than or equal to the non-holding upper limit time tu (in other words, when the non-holding duration time has become more than or equal to the non-holding upper limit time tu during a performance of the LCA), (S626: Yes), the DSECU 10 determines that the non-holding-condition-for-turning-control-off is satisfied and proceeds to a step S628 to stop the LTA. That is, the DSECU 10 sets the steering assist control state as the LTA•OFF state. At this time, the counting up of the count timer tn is stopped and the value of a point in time when the counting up is stopped is retained. After finishing the processing of the step S628, the DSECU 10 proceeds to a step S630 to tentatively terminate the routine of FIG. 6.

On the other hand, when it is determined that the non-holding duration time is less than the non-holding upper limit time tu (S626: No), the DSECU 10 returns to the step S606 to set the steering assist control state as the LTA•ON state. That is, the DSECU 10 finishes the LCA and resumes the LTA.

The DSECU 10 repeats the processing mentioned above every time the predetermined calculation interval elapses. When it is determined that the non-holding duration time has reached the non-holding warning time tw at the step S610 (S610: Yes) in the midst of the processing, the DSECU 10 determines that the non-holding-condition-for-warning is satisfied to proceed to the step S624. At the step S624, the DSECU 10 sounds the buzzer 13 to raise the non-holding warning (alerting) to the driver.

Thereafter, the DSECU 10 proceeds to the step S626 to determine whether or not the value of the count timer tn (the non-holding duration time) is more than or equal to the non-holding upper limit time tu. At a point in time when it has been determined that the non-holding duration time has reached the non-holding warning time tw at the step S610, the non-holding duration time is less than the non-holding upper limit time tu (S626: No). In this case, the DSECU 10 determines that the non-holding-condition-for-turning-control-off is not satisfied and returns to the step S606 to continue the LTA.

The DSECU 10 repeats the processing mentioned above every time the predetermined calculation interval elapses. When it is determined that the non-holding duration time has reached the non-holding upper limit time tu at the step S626 (S626: Yes) in the midst of the processing, the DSECU 10 determines that the non-holding-condition-for-turning-control-off is satisfied and proceeds to the step S628 to stop the LTA. That is, the DSECU 10 sets the steering assist control state as the LTA•OFF state. At this time, the counting up of the count timer tn is stopped and the value of a point in time when the counting up is stopped is retained.

After finishing the processing of the step S628, the DSECU 10 proceeds to the step S630 to tentatively terminate the routine of FIG. 6. Thereafter, the DSECU 10 returns to the step S600 and repeats the processing from the step S602 every time the predetermined calculation interval elapses until the ignition switch is turned off. It should be noted that when the non-holding-condition-for-warning becomes satisfied (S618: Yes) during a performance of the LCA, the non-holding warning is raised at the step S622. When the driver comes to hold the steering wheel as a result of the warning, the value of the count timer to is reset (S702: No, S706). After that, when the LCA completion condition is not satisfied (S620: No) and the non-holding-condition-for-warning becomes satisfied (S618: Yes) as a result of the non-holding state again continuing, the non-holding warning is again raised at the step S622. That is, the non-holding warning during a performance of the LCA can be raised more than once. The non-holding warning is raised every time the non-holding-condition-for-warning becomes satisfied. The same thing can be said to the non-holding warning during a performance of the LTA.

Effects of the present embodiment apparatus will be described. In a prior art steering assist apparatus, the non-holding duration time is measured only during a performance of the LTA. Besides, during a performance of the LTA, the prior art apparatus urges the driver to hold the steering wheel by raising the non-holding warning when the non-holding duration time becomes more than or equal to the non-holding warning time tw and urges the driver to hold the steering wheel by stopping the LTA when the non-holding duration time further increases to have reached the non-holding upper limit time tu.

In contrast, in the present embodiment apparatus, the non-holding duration time is measured not only during a performance of the LTA, but also during a performance of the LCA. Besides, when it is determined that the non-holding-condition-for-warning is satisfied during a performance of the LCA, the present embodiment apparatus raises the non-holding warning, whereas continues the LCA until the LCA completion condition becomes satisfied (that is, to the end) regardless of the non-holding duration time even though the non-holding state continues after the non-holding warning. By measuring the non-holding duration time also during a performance of the LCA and raising the warning when the non-holding-condition-for-warning becomes satisfied, it becomes possible to urge the driver to hold the steering wheel also during a performance of the LCA, not only during a performance of the LTA. On the other hand, by not stopping but continuing the LCA to the end regardless of the non-holding duration time (that is, for example, even though the non-holding duration time increases as a result of the driver not holding the steering wheel in spite of the warning being raised during a performance of the LCA), the LCA is prevented from being stopped in the midst of a performance thereof. Therefore, the vehicle can be prevented from deviating from the target lane due to the LCA being stopped. Hence, according to a configuration of the present embodiment apparatus, the vehicle can properly change the lane by the LCA while suppressing the driver from overestimating the steering assist control by urging the driver to hold the steering wheel during a performance of the steering assist control.

In addition, in the present embodiment apparatus, the non-holding duration time is not reset even when the types of the steering assist control are switched from each other. Therefore, when the non-holding state had continued before the LTA is resumed (that is, during a performance of the LCA) the non-holding duration time will be a sum of "the non-holding duration time during a performance of the LCA" and "the non-holding duration time after the LTA is resumed". According to this configuration, the non-holding-condition-for-turning-control-off becomes satisfied at an early timing after the LTA is resumed. That is, the LTA is stopped at an early timing.

For example, when the non-holding state is detected during a performance of the LCA and thereafter the LTA is resumed with the non-holding state remaining continued, the LTA is stopped immediately after being determined that the non-holding-condition-for-turning-control-off becomes satisfied after the LTA is resumed. Hence, it becomes possible to urge the driver to hold the steering wheel at an early timing and to more surely suppress the driver from overestimating the steering assist control.

Further, in the present embodiment apparatus, the conditions 3 and 4 among the LCA starting condition do not become satisfied when the LTA is not being performed, and therefore the LCA cannot be started. That is, when the LTA is stopped by being determined that the non-holding-condition-for-turning-control-off becomes satisfied during a performance of the LTA, the LCA cannot be started. Therefore, when the driver demands a performance of the LCA, the driver comes to hold the steering wheel (strictly, comes to hold the steering wheel so that the non-holding duration time does not become more than or equal to the non-holding upper limit time tu) in order for the LTA not to be stopped (that is, in order for the non-holding-condition-for-turning-control-off not to be satisfied). Hence, it becomes possible to urge the driver to hold the steering wheel during a performance of the LTA.

Further, in the present embodiment apparatus, when it is determined that the non-holding-condition-for-warning becomes satisfied during a performance of the LTA, the condition 4 among the LCA starting condition does not become satisfied, and therefore the LCA cannot be started. That is, when the non-holding warning is being raised to the driver as a result of the non-holding state continuing for more than or equal to the non-holding warning time tw, the LCA cannot be started even when the LTA is being performed. Therefore, when the driver demands a performance of the LCA, the driver comes to hold the steering wheel (strictly, comes to hold the steering wheel so that the non-holding duration time does not become more than or equal to the non-holding warning time tw) in order for the non-holding warning not to be raised (that is, in order for the non-holding-condition-for-warning not to be satisfied). Hence, it becomes possible to more surely urge the driver to hold the steering wheel during a performance of the LTA.

Further, in the present embodiment apparatus, during a performance of the LCA, the present embodiment apparatus continues the LCA until the LCA completion condition becomes satisfied regardless of the non-holding duration time. That is, during a performance of the LCA, "continuing the LCA to the end (until the LCA completion condition becomes satisfied)" is prioritized over "urging the driver to hold the steering wheel by stopping the LCA based on the non-holding duration time". Besides, the present embodiment apparatus determines whether or not the non-holding-condition-for-turning-control-off is satisfied at a point in time when the LCA completion condition has been satisfied, and when determined to be satisfied, the LTA is not performed. In this case, the driver comes to hold the steering wheel by noticing that the LTA has not been performed. Therefore, it becomes possible to urge the driver to hold the steering wheel at a relatively early timing (that is, a timing at which the LCA completion condition becomes satisfied) when the non-holding-condition-for-turning-control-off had been satisfied during a performance of the LCA, while suppressing the vehicle from deviating from the target lane during a performance of the LCA.

Hence, according to the present embodiment apparatus, the vehicle can properly change the lane by the LCA while suppressing the driver from overestimating the steering assist control by urging the driver to hold the steering wheel during a performance of the steering assist control.

The steering assist apparatus according to the present embodiment has been described. However, the present invention is not limited to the aforementioned embodiment and may adopt various modifications within a scope of the present invention.

For example, although the non-holding warning is raised when it is determined that the non-holding duration time has become more than or equal to the non-holding warning time tw in the present embodiment, the non-holding warning may not be raised. That is, a following configuration may be adopted, the configuration being a configuration where during a performance of the LTA, the DSECU 10 only determines whether or not the non-holding-condition-for-turning-control-off is satisfied whereas during a performance of the LCA, the DSECU 10 continues the LCA to the end (that is, until the LCA completion condition becomes satisfied) regardless of the non-holding duration time.

In addition, although the capacitance sensor is used as the non-holding sensor 42 and the non-holding duration time is measured using this capacitance sensor in the present embodiment, the non-holding duration time may be measured using a steering torque sensor or a camera instead of the capacitance sensor.

Further, although the non-holding warning is raised by sounding the buzzer 13 in the present embodiment, the non-holding warning may be raised by vibrating the steering wheel and/or the seat with a vibrator instead of or in addition to sounding the buzzer 13. Alternatively, the non-holding warning may be raised by indicating a warning message to the driver on the indicator.

Further, in the present embodiment, the setting operation device 14 is automatically set in such a manner that the LTA and the LCA are not to be performed when a performance of the ACC has not been selected and that the LCA is not to be performed when a performance of the LTA has not been selected. However, a configuration is not limited thereto. For example, the setting operation device 14 may be configured to be able to select performance of the LTA and the LCA even when a performance of the ACC has not been selected.

Further, although a lane recognized by the camera sensor 12 in the present embodiment, a configuration where, for example, a relative positional relationship of the own vehicle with respect to a lane is detected by the navigation ECU 70 may be adopted.

The invention claimed is:

1. A steering assist apparatus applied to a vehicle comprising:
   an electronic control unit configured to;
   recognize a lane to acquire lane information including a relative positional relationship of said vehicle with respect to said lane,
   perform a lane tracing assist control to assist a driver with a steering operation by changing a steered angle of a steered wheel of said vehicle such that a traveling position of said vehicle is kept at a predetermined position in a lane in a lane width direction based on said lane information and a lane changing assist control to assist said driver with said steering operation by changing said steered angle such that said vehicle changes a lane from an original lane on which said vehicle is currently traveling to a target lane adjacent to said original lane based on said lane information,
   detect a non-holding state which is a state where said driver of said vehicle is not holding a steering wheel, and
   measure a non-holding duration time which is a time for which said non-holding state is continuing during a performance of either said lane tracing assist control or said lane changing assist control to determine whether or not a first non-holding condition that said non-holding duration time is more than or equal to a predetermined first time is satisfied,
   wherein,
   said electronic control unit is configured to;
   during a performance of said lane tracing assist control,
   stop said lane tracing assist control when said first non-holding condition is determined to be satisfied, and
   during a performance of said lane changing assist control,
   continue said lane changing assist control until a completion condition of said lane changing assist control becomes satisfied regardless of said non-holding duration time.

2. The steering assist apparatus according to claim 1, wherein,
   said electronic control unit is configured to start said lane changing assist control when a predetermined first starting condition becomes satisfied,
   said first starting condition includes that said lane tracing assist control is being performed, and
   when said first starting condition becomes satisfied, said lane changing assist control is started in place of said lane tracing assist control.

3. The steering assist apparatus according to claim 1, wherein,
   said electronic control unit is configured to;
   start said lane changing assist control when a predetermined first starting condition becomes satisfied,
   when said first starting condition becomes satisfied, calculate a target locus function to determine a target locus which is a locus on which said vehicle moves from said original lane to a predetermined position of said target lane, taking a predetermined time, and
   perform said lane changing assist control based on said target locus function.

* * * * *